Dec. 20, 1949     J. P. WILLIAMS     2,491,594

TOASTER DEVICE

Filed June 4, 1947

INVENTOR.

James P. Williams

BY Victor J. Evans & Co.

ATTORNEYS

Patented Dec. 20, 1949

2,491,594

UNITED STATES PATENT OFFICE 2,491,594

TOASTER DEVICE

James P. Williams, Cumberland, Md.

Application June 4, 1947, Serial No. 752,398

3 Claims. (Cl. 99—394)

This invention relates to a toaster device for marshmallows, frankfurters, or sandwiches.

It is an object of the present invention to provide a toasting device which is adapted for use either with frankfurters, sandwiches or marshmallows wherein the same will be releasably retained by an adjustable part operable from the handle and adjustable to release the food when it has been cooked.

Other objects of the present invention are to provide a toasting device for outdoor use which is of simple construction, inexpensive to manufacture and convenient to use.

For other objects and for a better understanding of the invention, reference may be had to the following detailed description taken in connection with the accompanying drawing, in which Fig. 1 is a plan view of my toasting device with the arrangement adapted for use in toasting marshmallows wherein a strip of metal is extended between the parts on the ends of which are disposed the marshmallows.

Figure 1:
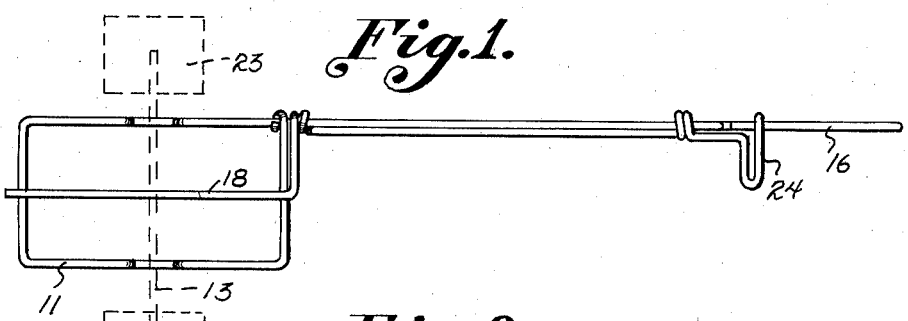
Figure 2:
Fig. 2 is a side elevational view of the toaster.
Figure 3:
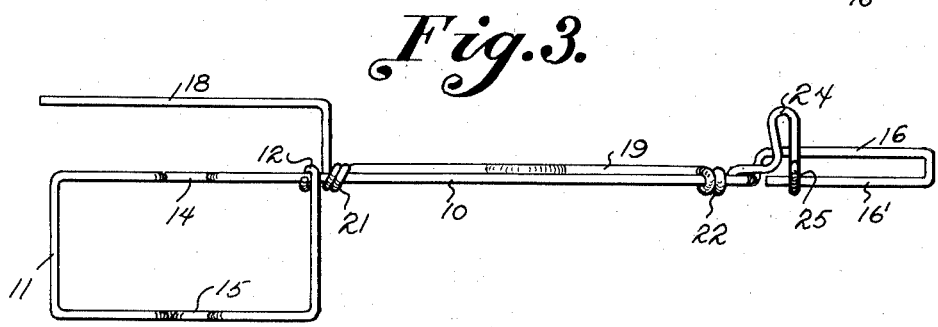
Fig. 3 is a top plan view of the toaster with the adjustable arm in the laterally extended position.
Figure 4:
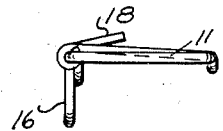
Figs. 4 and 5 are respectively end elevational views of the toasting device as viewed with the adjustable member in the position shown in Fig. 1.
Figure 5:
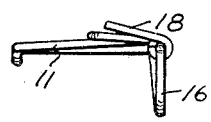

Referring now to the figures, 10 represents a main member having a forward portion 11 bent into the form of a loop and connected as at 12 to the main part. This loop 11 serves as a support for different foods such as a sandwich and for a bar or strip 13 which can be extended across the same in the depressions 14 and 15.

At the rear end of the main part 10 is a second loop 16 which serves as a handle portion. The end of the loop 16 is not fastened to the main part but is left detached therefrom as indicated at 17.

On the main part 10 there is journalled an adjustable tong 18 which is adapted to be extended over the loop 11 to retain any food which may be extended over and supported upon the loop. Frankfurters can be extended across the loop and with the tong 18 adjusted thereover they will be retained while being toasted in a flame. The frankfurters also may be pierced by the tong 18. The tong 18 is an extension of a portion 19 extending along the main part and turned to coil portions as indicated at 21 and 22 so as to be retained on the main part 10 for rotatable adjustment.

If it is desired to toast marshmallows, a metal strip 13 is extended across the loop and within the indentation 14 and 15 and the tong 18 is brought downwardly upon the same to hold it in tight engagement with the indentation. Marshmallows 23 are disposed on the end of the member 13.

The rearward end of the portion 19 of the adjustable tong has a handle formation 24 thereon which terminates in a loop 25 that is fastened to the end of loop 16 which is free. The loop or eye 25 is offset from the coil portion 22 so that the loop 16 serves as a spring device for retaining the handle 24 and consequently the tong 18 in any one of its adjusted positions. The tension upon the loop end as indicated at 16' upon the same being extended slightly to the left or right of the vertical is sufficient to retain the handle 24 in the position to which it has been adjusted.

While various changes may be made in the detail construction, it shall be understood that such changes shall be within the spirit and scope of the present invention as defined by the appended claims.

I claim:

1. A toasting device comprising a main member with a loop portion at the rear thereof, said loop portion having its end free of the main portion and adapted to be sprung or tensioned, a member rotatably adjustable on the main member having a portion offset from its axis of rotation and receiving the spring end of the rear loop of the main member, whereby said adjustable member will be retained by the spring end against rotation when the same has been adjusted.

2. A toaster device comprising a main part with a large loop on one end serving as a support for the food element to be toasted, said loop extended to one side of the main portion of the main member, an adjustable tong adapted to be extended over the loop to retain the food elements thereon, said tong having a portion journalled on the main portion of the main member and handle means on said portion for rotating the tong, and said main member having a loop on the rear end of the main portion thereof adapted to serve as a handle but having its end free of the main portion, said free end adapted to be sprung or offset, said handle means on the portion of the tong having an eye formation therein extending over the spring end of the loop at the rear of the main member, said eye formation being offset so that the spring end will be effected to retain the handle and the tong in any position to which they have been adjusted.

3. A toaster as defined in claim 2, and said loop having indentations thereon across which a bar can be extended and retained by the tong, said bar being adapted to receive on opposite ends of the same marshmallows or other food elements.

JAMES P. WILLIAMS.

REFERENCES CITED

The following references are of record in the file of this patent:

UNITED STATES PATENTS

| Number | Name | Date |
| --- | --- | --- |
| 99,971 | Taylor et al. | Feb. 15, 1870 |
| 590,478 | Elliott | Sept. 21, 1897 |